No. 850,666. PATENTED APR. 16, 1907.
W. E. MAULL.
TRAP.
APPLICATION FILED FEB. 13, 1906.
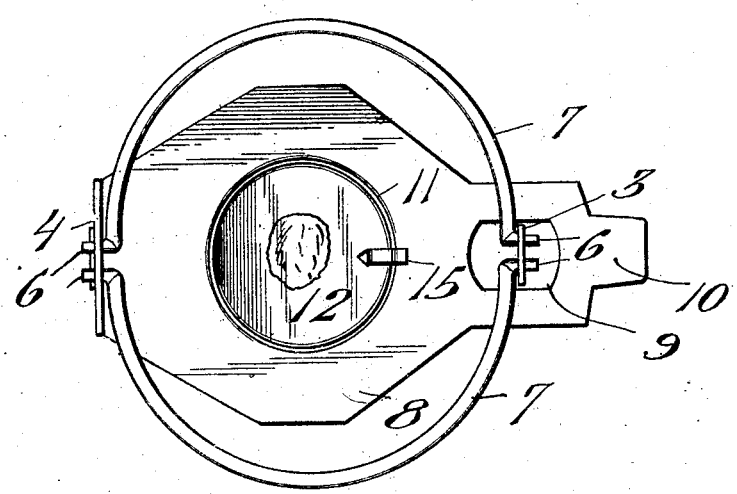
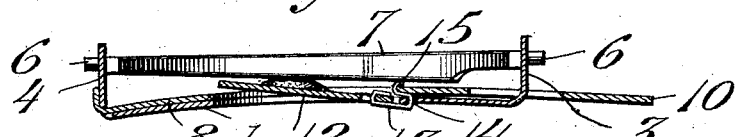
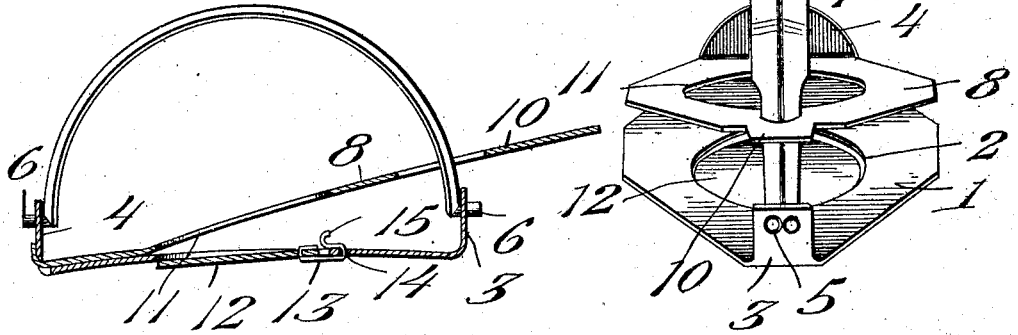
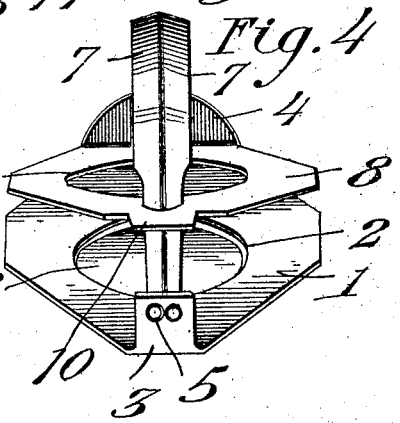
Inventor
W. E. Maull.
Witnesses
By Victor J. Evans
Attorney

UNITED STATES PATENT OFFICE.

WILLIAM E. MAULL, OF ST. LOUIS, MISSOURI.

TRAP.

No. 850,666.   Specification of Letters Patent.   Patented April 16, 1907.

Application filed February 13, 1906. Serial No. 300,908.

*To all whom it may concern:*

Be it known that I, WILLIAM E. MAULL, a citizen of the United States, residing at St. Louis, in the county of St. Louis City and State of Missouri, have invented new and useful Improvements in Traps, of which the following is a specification.

This invention relates to animal-traps, the object of the invention being to provide a simple, effective, and reliable spring-trap, the parts of which are so combined and arranged as to catch the animal's leg in the fleshy part close to the body, so as to avoid breaking the bones of the leg and enabling the animal to gnaw away the remaining flesh and escape.

A further object of the invention is to so combine and arrange the parts of the trap that the actuating element of the trap may be set independently of the jaws, thus enabling the jaws to be subsequently set in proper position without injuring the fingers or hands of the operator.

With the above general objects in view, the invention consists in the novel construction, combination, and arrangement of parts hereinafter more fully described, illustrated, and claimed.

In the accompanying drawings, Figure 1 is a plan view of a trap embodying the present invention shown set. Fig. 2 is a vertical sectional view of the same. Fig. 3 is a section similar to Fig. 2, showing the trap sprung; and Fig. 4 is a perspective view of the trap sprung.

The trap contemplated herein comprises, essentially, a frame 1, consisting of a plate of suitable thickness provided with a large central aperture 2, and, further, provided at diametrically opposite points with lugs 3 and 4. The lugs 3 and 4 are provided with bearings 5 for the oppositely-projecting pintles 6 of a pair of oppositely-arranged semicircular jaws 7, which are adapted to swing from a horizontal to a vertical plane in catching the animal, said jaws when in their vertical position lying close to or in contact with each other, as shown in Fig. 4.

Arranged just above the frame-plate 1 is the actuating element or spring 8, which is approximately of the same shape as the base-plate and permanently connected at one side of the central opening to the frame-plate, as shown at 8, the opposite end of the spring-plate being left free and provided with an opening 9, through which the inner ends of the jaws 7 pass, as shown in Fig. 3. The spring is also provided with an extension or lip 10, adapted to be grasped by the operator in setting the actuating element or spring 8. It will now be seen that as the spring 8 flies upward it operates on the jaws 7 and swings the latter quickly upward, the side edges of the spring at opposite sides of the opening 9 engaging the jaws and holding the same together in the manner illustrated in Fig. 4. The spring 8 is also provided with a large central aperture 11, corresponding with the aperture 2 of the frame-plate.

12 designates a bait holder or pan of disk shape and slightly smaller than the central apertures 2 and 11 above described. This holder or pan is arranged in the central aperture 2 and is connected pivotally to the frame-plate 1 by means of a clip 13, which passes through a slot 14 in the frame-plate and is extended to form a catch or small hook 15, which is designed to pass through the aperture 9 of the spring 8 and engage against the upper surface thereof immediately adjacent to said aperture 9 for the purpose of holding down the spring 8 until the animal steps upon the bait holder or pan, the effect of which is to depress said holder or pan, which also constitutes the trigger of the trap, and thereby release the spring and throw the jaws upward into catching position.

It will be seen that the operator may set the actuating element or spring 8 without handling the jaws and exposing himself to the danger of having his fingers or hands caught between said jaws. After the spring is set then the jaws may be placed in a horizontal position, which completes the setting of the trap.

In placing the trap the trapper makes a hole in the ground several inches in depth and places the trap immediately over the hole, thereby giving the bait holder or pan an opportunity to move downward with the animal's foot resting thereon, thus catching the animal high on the leg. As soon as the bait holder or pan is released from engagement with the spring it is free to swing downward by gravity into the hole beneath the trap.

I claim—

A spring-jaw trap comprising a frame-plate having a central aperture therein, jaws pivotally connected to said plate, a jaw-actuating spring-plate connected with the frame-plate and having a central aperture of the same size as the aperture in the frame-plate and disposed coincidently thereto and a combined bait-holder and trigger connected to the frame-plate and disposed within the aperture in said frame-plate, and said trigger provided
5 with a hook to engage the inner edge of the aperture in the spring-plate, substantially as described.

In testimony whereof I affix my signature in presence of two witnesses.

WILLIAM E. MAULL.

Witnesses:
    JOHN H. GIVANS,
    HENRY G. BORSING.